United States Patent [19]
Chakraborty et al.

[11] Patent Number: 6,076,622
[45] Date of Patent: Jun. 20, 2000

[54] SYSTEM AND METHOD FOR INTELLIGENT CRUISE CONTROL USING STANDARD ENGINE CONTROL MODES

[75] Inventors: Shubhayu Chakraborty, Wixom, Mich.; William J. Mack, Clemmons, N.C.

[73] Assignee: Eaton VORAD Technologies, LLC, San Diego, Calif.

[21] Appl. No.: 09/064,278

[22] Filed: Apr. 22, 1998

Related U.S. Application Data

[62] Division of application No. 08/396,640, Mar. 1, 1995, Pat. No. 5,839,534.

[51] Int. Cl.[7] ................................................ B60K 31/00
[52] U.S. Cl. ........................................ 180/169; 180/170
[58] Field of Search ...................... 180/167, 169, 180/170, 178, 179, 197; 477/123; 123/349, 350, 399; 701/96, 1

[56] References Cited

U.S. PATENT DOCUMENTS

| | | |
|---|---|---|
| 4,519,469 | 5/1985 | Hayashi et al. . |
| 4,706,195 | 11/1987 | Yoshino et al. . |
| 4,916,450 | 4/1990 | Davis . |
| 4,930,594 | 6/1990 | Koshizawa et al. . |
| 5,003,483 | 3/1991 | Hedstrom . |
| 5,014,200 | 5/1991 | Chundrlik et al. . |
| 5,026,153 | 6/1991 | Suzuki et al. . |
| 5,053,979 | 10/1991 | Etoh . |
| 5,161,632 | 11/1992 | Asayama . |
| 5,165,497 | 11/1992 | Chi . |
| 5,166,681 | 11/1992 | Bottesch et al. . |
| 5,197,562 | 3/1993 | Kakinami et al. . |
| 5,230,400 | 7/1993 | Kakinami et al. . |
| 5,234,071 | 8/1993 | Kajiwara . |
| 5,299,130 | 3/1994 | Ono . |
| 5,303,019 | 4/1994 | Irie . |
| 5,314,037 | 5/1994 | Shaw et al. . |
| 5,341,144 | 8/1994 | Stove . |
| 5,357,438 | 10/1994 | Davidian . |
| 5,386,285 | 1/1995 | Asayama . |
| 5,388,048 | 2/1995 | Yavnayi et al. . |
| 5,389,053 | 2/1995 | Steeby et al. . |
| 5,396,426 | 3/1995 | Hibino et al. ............................. 701/96 |
| 5,400,864 | 3/1995 | Winner et al. . |
| 5,416,711 | 5/1995 | Gran et al. . |
| 5,436,835 | 7/1995 | Emry . |
| 5,467,272 | 11/1995 | Yoshida et al. ............................. 701/1 |
| 5,490,064 | 2/1996 | Minowa et al. ......................... 180/197 |
| 5,718,199 | 2/1998 | Hu et al. ................................. 180/179 |

FOREIGN PATENT DOCUMENTS

| | | |
|---|---|---|
| 0 612 641 A1 | 8/1994 | European Pat. Off. . |
| 3-70634 | 3/1991 | Japan . |

OTHER PUBLICATIONS

"Deliverance From Evil.", Advertisement from Heavy Duty Trucking Magazine, May 1994.

*Primary Examiner*—Paul N. Dickson
*Assistant Examiner*—F. B. Vanaman
*Attorney, Agent, or Firm*—Brooks & Kushman P.C.

[57] ABSTRACT

A method for implementing an intelligent cruise control using standard engine control modes includes determining the distance and closing rate relative to a forward object or vehicle and using this information to implement a distance control mode and a speed control mode. The distance control mode maintains a selectable headway range relative to a forward object or vehicle and may include accelerating the vehicle or decelerating the vehicle by defueling, engaging an engine brake, or downshifting the transmission when engine speed permits. The speed control mode maintains a selectable cruising speed if no target vehicle is detected. This cruising speed set point also functions as an upper limit while in the distance control mode. The system and method effect the intelligent cruise control functions utilizing control logic external to the electronic engine control module utilizing the engine speed control mode or engine speed and torque limiting control mode of SAE J1922 or SAE J1939 standards. Alternatively, a cruise control limit speed may be broadcast via SAE J1587 to reduce the vehicle speed upon approaching a forward vehicle so as to reduce the need for driver intervention. The invention may periodically switch between engine control modes to avoid any control mode timeout imposed by some engine manufacturers.

17 Claims, 7 Drawing Sheets

SYSTEM AND METHOD FOR INTELLIGENT CRUISE CONTROL USING STANDARD ENGINE CONTROL MODES

CROSS-REFERENCE TO RELATED APPLICATION

This application is a divisional application of copending U.S. App. No. 08/396,640, filed Mar. 1, 1995, U.S. Pat. No. 5,839,534 the disclosure of which is hereby incorporated by reference in its entirety.

TECHNICAL FIELD

The present invention relates to methods for providing intelligent cruise control using standard engine control modes.

BACKGROUND ART

As microprocessors continue to evolve, their use in a wide variety of control applications becomes more pervasive. Various industries, such as the automotive and heavy-duty trucking industries, have continued to utilize the increasing computational speeds available at decreasing prices to afford the vehicle operator with a variety of enhanced safety features and conveniences. Manufacturers continually strive to differentiate their unique enhancements, features, and implementations from those of competitors often resulting in proprietary vehicle systems and subsystems which are difficult to integrate. The norm in the heavy-duty trucking industry is for vehicle purchasers to specify individual systems and subsystems which may be produced by different manufacturers. For example, a customer may specify one engine manufacturer, another transmission manufacturer, and a third axle manufacturer. This necessitates cooperation among the selected vehicle systems which is facilitated by the promulgation of industry standards or recommended practices.

A number of standards organizations have attempted to standardize vehicle system components and their associated methods of operation. Unfortunately, efforts of various standardization committees often lag the rapid pace of technology development and are in effect de facto standards. Thus, many systems designed according to developing standards, guidelines, or recommendations are not amenable to integration or adaptation with newly developed technology. It is therefore desirable for such new components, systems, and methods of operation to be capable of being adapted to existing vehicles without significantly affecting the price, performance, or operation of the new technology.

As standards, recommendations, and guidelines are developed, they typically undergo significant revisions and modifications. A system designed to conform with any particular draft of a standard may not be entirely compatible with subsequent revisions, additions or modifications. Furthermore, different organizations may have different opinions regarding which system, protocol, or method of operation is more desirable leading to promulgation of incompatible "standards". Thus, it is often desirable to design configurable systems which conform to various recommendations or specifications which may be published by different standards committees or as draft proposals during development.

Electronically controlled internal-combustion engines are well established in the art and have been used in various types of vehicles, including heavy-duty tractor semi-trailer vehicles, for a number of years. As such, standards, recommendations, guidelines, specifications, and the like, hereinafter collectively referred to as standards, are continually developed and published by various organizations. These standards designate component characteristics, testing procedures, and methods of operation. Such organizations include the International Standards Organization (ISO), the Society of Automotive Engineers (SAE), and the Institute for Electrical and Electronics Engineers (IEEE), among numerous others. Often standards published by one organization will have corresponding designations in other organizations or may be a conglomeration of various other standards. Standards of particular interest in providing electronic engine control for vehicles such as heavy-duty tractor semi-trailer vehicles are published by the SAE and designated SAE J1922 and SAE J1939. The J1922 standard is an interim standard, eventually to be supplanted by the J1939 standard when finalized. As such, the J1922 and J1939 standards include a number of similarities in prescribing control system design and operation for compression-ignition internal-combustion engines, such as diesel engines. As is known, ISO 11898 is generally similar to and compatible with SAE J1939.

The J1922 and J1939 standards define various control modes for electronically controlled engines including a normal mode, a speed control mode, a torque control mode, and a speed and torque limit control mode. In normal mode, engine fueling is controlled based primarily on input received from the vehicle operator, typically via an accelerator pedal. Of course a number of other factors influence the actual determination of engine fueling as described in greater detail below. In speed control mode, engine fueling is controlled to maintain a substantially constant engine speed. In torque control mode, a substantially constant engine output torque (as a percentage of total available torque) is effected regardless of engine speed and vehicle speed. Speed and torque limit control mode imposes an upper limit on engine speed and/or engine output torque. The override modes may be used to override the current operating mode and command the engine to a particular engine speed or engine output torque. The control mode is based on current operating conditions and commands received by the engine controller which may be generated by various other vehicle systems and subsystems or by the vehicle operator. A more detailed description of the modes of operation may be found in the J1922 and J1939 specifications published by the SAE, the disclosures of which are hereby incorporated by reference in their entirety. Other, related standards utilized in electronic engine control and communication include SAE J1587, SAE J1708, and SAE J1843, the disclosures of which are also hereby incorporated by reference in their entirety.

Traditional cruise control functions are implemented by the engine controller and utilized to automatically maintain a desired road speed or a desired engine speed without the need for operator intervention. Typically, an on/off switch is provided for the cruise control in addition to a switch which sets the desired vehicle speed or engine speed to the current operating speed when the switch is actuated. Some systems provide an additional switch for incremental speed adjustments and automatically returning to a previously set speed.

Under steady driving conditions, the use of cruise control may reduce driver fatigue and improve comfort while also enhancing fuel economy in many applications. However, an ever-increasing traffic volume often results in congested roadways which reduces or eliminates opportunities for maintaining a preset fixed speed over a long period of time, thereby limiting the associated advantages of cruise control.

Furthermore, vehicle operators are likely to avoid using cruise control in marginal conditions when traffic continually slows and accelerates due to the need for repeated driver intervention to set and reset the cruise control, even if these events are separated by several minutes. Thus, providing a cruise control system and method which could accommodate variations in traffic speed would allow increased cruise control utilization and a corresponding increase of attendant benefits.

Recent advancements in cruise control technology have resulted in systems which are capable of measuring and maintaining a substantially constant following distance or headway distance relative to a forward vehicle. Headway distance is determined based on the current vehicle speed and closure rate and is often designated in seconds while following distance is independent of speed and closure rate and is designated in feet. These so-called intelligent or adaptive cruise control functions typically utilize an electromagnetic beam, such as a laser beam, a microwave radar beam, or a video image, to determine the inter-vehicle distance and closure rate between the host vehicle and one or more forward vehicles. This information may be used to automatically adapt to the traffic flow and "track" or follow the forward vehicle at a desired following distance selected by the operator. Distance and closure rate information may also be used to warn the vehicle operator of a potentially hazardous situation such as following the forward vehicle too closely for the current vehicle speed or approaching the forward vehicle or another object too rapidly such that a collision may occur.

Some prior art intelligent cruise control systems are designed for custom applications which require complete system integration when th e vehicle is de signed, manufactured, and assembled. In these systems, the intelligent cruise control module may control vehicle acceleration/deceleration through a customized engine control module which may implement an intelligent cruise control algorithm to modify engine fueling or effect vehicle braking. These systems, however, fail to provide a system which may be installed without significant changes to currently available engine control modules. furthermore, these systems are difficult to retrofit or may be completely incompatible with existing vehicles without significant system modification and expense, particularly in medium and heavy-duty truck applications employing diesel engines. Thus, it is desirable to have a system and method for implementing an intelligent cruise control function in vehicles which may or may not have traditional cruise control functions, without substantial system modification.

DISCLOSURE OF THE INVENTION

Thus, it is an object of the present invention to provide a system and method for intelligent cruise control which may be combined with existing vehicle systems and subsystems without significant modifications.

It is a further object of the present invention to provide a system and method for intelligent cruise control which automatically track the speed of a forward vehicle.

Another object of the present invention is to provide a system and method for cruise control which maintain a substantially constant headway time relative to a forward vehicle using standard engine control modes.

A further object of the present invention is to provide a system and method for intelligent cruise control using standard engine control modes which smoothly approach a forward vehicle to attain the desired headway time with little or no overshoot.

A still further object of the present invention is to provide a system and method for intelligent cruise control which accommodate a broad range of vehicle weights typical of MVMA Class 7 and Class 8 medium and heavy-duty vehicles.

Yet another object of the present invention is to provide a system and method for intelligent cruise control which are insensitive to small disturbances in an inter-vehicle distance or relative velocity signal.

A further object of the present invention is to provide a system and method for intelligent cruise control which reduce sensitivity to road load variations.

A further object of the present invention is to provide a system and method for intelligent cruise control which allow the vehicle operator to select a desired headway distance.

An additional object of the present invention is to provide a system and method for intelligent cruise control which utilize the engine speed control mode of the SAE J1922 and SAE J1939 standards.

Another object of the present invention is to provide a system and method for intelligent cruise control which utilize the engine speed and torque limit control mode of the SAE J1922 and SAE J1939 standards.

A further object of the present invention is to provide a system and method for intelligent cruise control which control an engine retarder and/or a vehicle transmission (and/or a driveline retarder) to provide enhanced deceleration so as to reduce operator intervention.

In carrying out the above objects and other objects and features of the present invention, a system according to the present invention includes control logic which determines an appropriate deceleration value based on the sensed parameter, a selectable desired following distance, and the available devices for decelerating the vehicle. The control logic monitors the signal received from the sensor to detect sensor status and characterize the reliability of the sensed parameter. Preferably, the control logic communicates with the electronic control module using the SAE J1922 or SAE J1939 standards and broadcasts a desired engine speed or a desired engine speed and torque limit value. The system allows the vehicle operator to override the intelligent cruise control via an accelerator pedal and to automatically return to the intelligent cruise control mode when the accelerator pedal returns below a predetermined threshold. Furthermore, the system of the present invention accommodates a broad range of vehicle weights common to the heavy-duty trucking industry.

A method according to the present invention for use in a vehicle having an engine controlled by an electronic control module and control logic in communication with a distance sensor and the electronic control module includes sensing a parameter indicative of inter-vehicle distance between the vehicle and a forward vehicle, determining a desired deceleration (or acceleration) value based on the inter-vehicle distance and a selected desired following distance, and broadcasting a message to control road speed of the vehicle so as to maintain the desired following distance. In one embodiment, the control logic communicates with an automated transmission and with an engine braking device to provide more control authority over vehicle deceleration in response to the inter-vehicle distance. The method also includes maintaining a selectable set speed when no forward vehicle is detected and limiting acceleration to the selectable set speed while attempting to achieve the desired following distance.

In one embodiment of the present invention, the method includes utilizing the engine speed control mode of J1922/

J1939 while in another embodiment, the method includes utilizing the engine speed and torque limit control mode of J1922/J1939. In yet another embodiment, the method includes broadcasting a cruise control upper limit via J1587 to effect defueling of the engine. To facilitate use with engines which limit the allowable time in engine control override modes, the present invention also provides for periodically switching between available control modes.

The advantages accruing to the present invention are numerous. The system and method of the present invention automatically adjust the vehicle speed to reduce driver intervention in attaining a desired headway or following distance between the host vehicle and a forward vehicle and maintaining that headway or following distance. For example, it is desirable to automatically reduce the cruising speed without driver intervention when a vehicle approaches a forward vehicle. Once the forward vehicle is no longer detected, the system and method of the present invention allow acceleration to a previously set cruising speed. Furthermore, the system and method of the present invention utilize standard engine control modes and are therefore easily implemented on a variety of different engines conforming to those standards.

Since the system and method of the present invention may use standard control commands which may be used in conjunction with traditional cruise control implemented by the electronic control module, the present invention provides purchasers an alternative cruise control strategy independent of the particular engine or transmission purchased. Furthermore, the present invention accommodates various engine manufacturers without masking their characteristic control "style" or "feel", i.e. whether vehicle response is firm, aggressive, or soft, etc. Unlike some prior art intelligent cruise control systems, the present invention provides for a selectable rather than a fixed headway distance.

The above objects and other objects, features, and advantages of the present invention will be readily appreciated by one of ordinary skill in this art from the following detailed description of the best mode for carrying out the invention when taken in connection with the accompanying drawings.

BEST MODE FOR CARRYING OUT THE INVENTION

Figure 1:
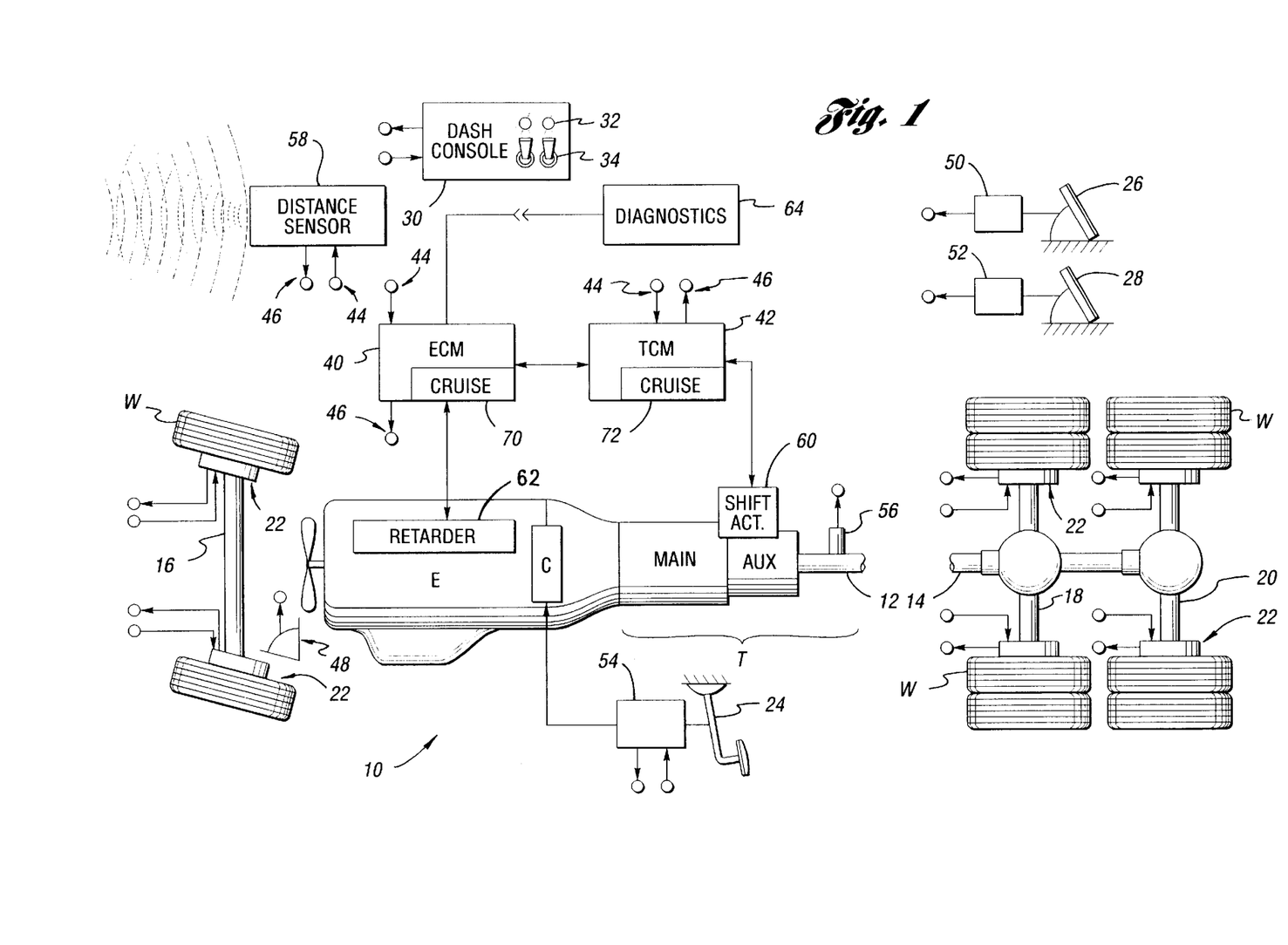
FIG. 1 is a block diagram of a vehicle system for implementing intelligent cruise control according to the present invention.

Referring now to FIG. 1, a graphical representation of one embodiment of a system and method for intelligent cruise control according to the present invention is shown. FIG. 1 depicts a vehicle 10, such as a tractor of a tractor semi-trailer vehicle, having an electronically controlled engine E coupled to a compound transmission T via a clutch mechanism C. Although a vehicle such as depicted in FIG. 1 represents one of the possible applications for the system and method of the present invention, it should be appreciated that the present invention transcends any particular type of vehicle employing an electronically controlled engine implementing standard engine control functions which utilize distance information and/or closure rate information as described herein.

In a preferred embodiment, transmission T is a compound change gear or change speed transmission having a main section connected in series with an auxiliary section which includes an output shaft 12 coupled to a vehicle drive shaft 14. Vehicle 10 includes at least two axles such as a steer axle 16 and at least one drive axle, such as axles 18 and 20. Each axle supports corresponding wheels W having foundation or service brake components 22 which may be manually or automatically actuated depending upon the particular application and operating conditions. For example, a vehicle equipped with ABS may assume automatic control of braking under appropriate conditions such as when the vehicle is braking and the system detects a sufficient slip differential among one or more wheels. The operation of an ABS system is unaffected by operation of the present invention since the ECM utilizes a priority system defined by the SAE J1922 or J1939 standard. This priority system provides the ABS system a higher priority than the intelligent cruise control functions such that the intelligent cruise control need not be aware of ABS operation. Service brake components 22 may include wheel speed sensors and electronically controlled pressure valves to effect control of the vehicle braking system as described herein.

Vehicle 10 may also include conventional operator controls such as clutch pedal 24, (in some manual systems) accelerator pedal 26, brake pedal 28, and an operator interface, such as dashboard control console 30, which may include any of a number of output devices 32, such as lights, displays, buzzers, gages, and the like, and various input devices 34, such as switches, push buttons, potentiometers, or the like. The vehicle control system includes an electronic control module such as engine control module (ECM) 40 and preferably includes an additional electronic control module for effecting control of transmission T, such as transmission control module (TCM) 42. Of course, engine and transmission control may be combined in a single electronic control module for some applications. The ECM 40 and TCM 42 communicate with a variety of sensors via inputs 44 and with numerous actuators via outputs 46. Sensors may include a steering angle sensor 48, wheel speed sensors (included in braking components 22), an electronic accelerator pedal sensor (APS) 50, a brake pedal sensor or switch 52, a clutch control/sensor 54, an output speed sensor 56, and a sensor 58 which indicates inter-vehicle distance and/or closing rate, among numerous others. Preferably, sensor 58 provides distance and closure rate information relative to vehicle 10 and at least one forward vehicle. In a preferred embodiment, sensor 58 is part of an Eaton VORAD EVT-200 collision warning system which is commercially available from the assignee of the present invention.

Actuators may include a shift actuator 60 for automatically effecting a gear shift within transmission T, electronically controlled pressure valves (included in braking components 22), and an engine retarder 62. As is known, an engine retarder is a device utilized to supplement the foundation or service brakes when descending long grades and to prolong service brake life in high-frequency start and stop operation. Retarders may be categorized as engine brakes, exhaust brakes, hydraulic retarders and electric retarders. In a preferred embodiment, engine retarder 62 is an engine brake such as the well known "Jake" brake. This device converts a power producing diesel engine into a power absorbing air compressor. This is achieved by shutting off the fuel and hydraulically opening the exhaust valve as the piston approaches top dead center during the compression stroke. It is important to verify that the fuel flow to the engine has been discontinued before activating the engine brake. Otherwise, an uncombusted fuel mixture would be exhausted. Thus, many engine manufacturers disable the engine brake when cruise control is engaged. However, the present invention may utilize the engine retarder when intelligent cruise control is engaged to enhance vehicle deceleration. This is accomplished by directly controlling the engine retarder only after determining that no fuel is present in the cylinders as described in detail below.

As also illustrated in FIG. 1, a diagnostics module 64 may be selectively connected to ECM 40 and preferably communicates status messages as defined by the SAE J1587 protocol to facilitate diagnostics, service, and maintenance of vehicle 10. These messages are also available to other system microprocessors such as TCM 42 and include information such as current engine speed and torque, accelerator position, road speed, cruise control status, and cruise control set speed, among many others. Cruise control status includes information relative to various cruise control switches, brake pedal switch, and clutch pedal position, among others.

ECM 40 communicates with TCM 42 preferably according to either the SAE J1922 or SAE J1939 standard. Preferably, the communication link between ECM 40 and TCM 42 conforms to the SAE J1708 physical layer standard or the CAN (controller area network) standard. Also preferably, distance sensor 58 communicates with ECM 40 and/or TCM 42 via a communication link complying with SAE J1708 or CAN and communication standards substantially similar to SAE J1922 or SAE J1939. It will be appreciated by one of ordinary skill in the art that the various connections between electronic controllers, sensors, and actuators may be changed to accommodate the particular requirements of a specific application without departing from the spirit or scope of the present invention. Similarly, various communication links and protocols may be accommodated with appropriate translators or converters. For example, in one embodiment of the present invention, distance sensor 58 communicates directly with ECM 40 utilizing J1708 and J1939. In another embodiment of the present invention, distance sensor 58 communicates serially via an RS232 link which is converted first to J1708 and then to CAN protocol to communicate with TCM 42 which then communicates with ECM 40 via a CAN/J1708 converter and J1922 messaging protocol. Thus, the present invention relies on the exchange of control and status information which is independent of the particular data path, and in some cases the messaging protocol, utilized in the information exchange.

The ECM 40, TCM 42, and sensor 58 may contain logic rules implemented in a variety of combinations of hardware circuitry components and programmed microprocessors to effect control of the various vehicle systems and subsystems. Often, control functions are logically separated and have specific input parameters, control equations, and output parameters which may be unique or shared with other logical control functions and/or other system and subsystem controllers. Cruise control functions (either intelligent or traditional) are represented schematically by cruise control block 70 within ECM 40 which represents the particular logic rules utilized to effect these functions as described herein. Similarly, TCM 42 includes cruise control block 72 which represents the logic rules necessary to implement cruise control functions and may include intelligent cruise control functions when utilized with sensor 58. Alternatively, sensor 58 may contain control logic to effect the intelligent cruise control via a communications interface according to the present invention. Thus, various aspects of the present invention are independent of the particular location of the microprocessor and/or circuitry which implement the control logic.

For example, in one embodiment of the present invention, cruise control blocks 70 and 72 implement traditional cruise control functions for engine E and transmission T, respectively, while sensor 58 includes logic rules to effect intelligent cruise control functions (best illustrated in FIG. 10) for engine E and/or transmission T. In this embodiment, sensor 58 preferably communicates directly with ECM 40 using SAE J1922/J1939. In another embodiment of the present invention, sensor 58 provides distance and closure rate information to TCM 42 and cruise control block 72 effects intelligent cruise control functions while cruise control block 70 within ECM 40 effects traditional cruise control functions. In this embodiment, sensor 58 is preferably connected to TCM 42 and need not utilize any particular communications protocol.

Figure 2:
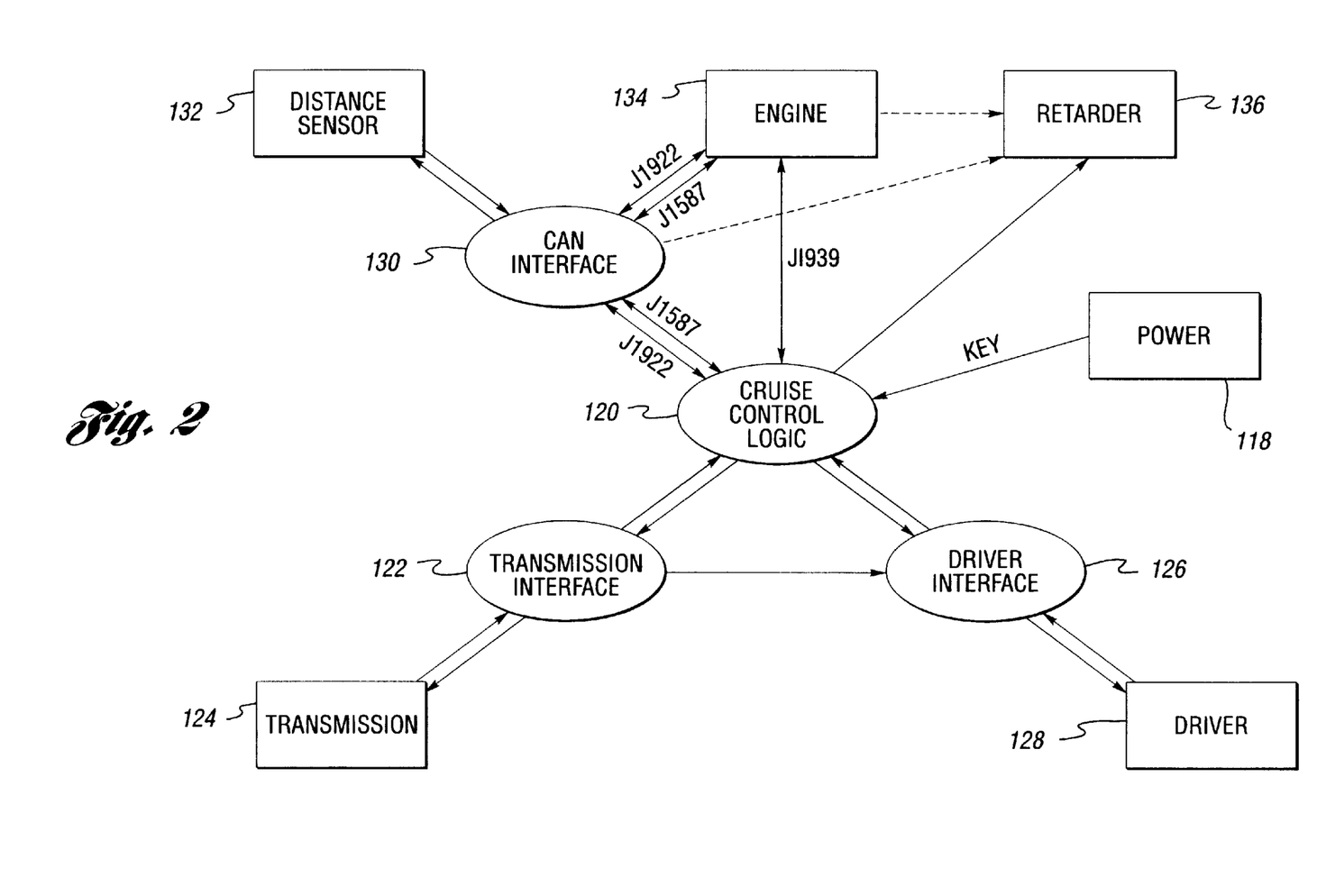
FIG. 2 is a block diagram illustrating logical connections and data flow in a system and method for intelligent cruise control according to the present invention.

Referring now to FIG. 2, a block diagram illustrating the logical links and data flow of the system and method for intelligent cruise control according to the present invention is shown. System power is preferably provided by a key switch such as a conventional ignition switch as indicated by block 118. The control logic implementing the intelligent cruise control is indicated by block 120. In a preferred embodiment, the cruise control logic communicates with a transmission interface 122 and exchanges various status and control information. Status information may include vehicle brake switch status, transmission gear, engine speed and road speed. Control information may include a transmission shift request, or engine speed control commands to attain synchronous engine speed during a gear shift.

Transmission interface 122 is connected to the vehicle transmission control module 124 to monitor various transmission sensors and control various actuators to obtain information such as the current transmission gear and effect gear shifts under appropriate operating conditions. Transmission interface 122 also provides road speed information to driver interface 126. The vehicle operator or driver, indicated schematically by block 128 exchanges information with the vehicle systems via driver interface 126. Preferably, the driver interface for intelligent cruise control is substantially similar to a conventional cruise control interface so as to provide a nominal learning curve to utilize the intelligent cruise control features. The vehicle driver selects a desired following (headway) distance (preferably in seconds) via a potentiometer located on the dashboard console. Preferably, the selectable headway range varies continuously from about one (1) second to four (4) seconds which corresponds to an inter-vehicle distance dependent upon current vehicle speed. A cruise set point switch is also provided to establish the current road speed as the set point when depressed.

Other switches may be provided to turn the intelligent cruise functions off so the system functions as a traditional cruise control system. Driver interface 126 may also provide status information to the driver via lights, alphanumeric displays, or the like. Furthermore, driver interface 126 may include controls to enable use of the engine retarder and the level of retardation corresponding to operation of the retarder on two, four, or six cylinders.

Driver interface 126 converts the desired headway distance to a following distance utilizing the vehicle speed provided from transmission interface 122 and communicates this information to cruise control logic 120 along with the state of the cruise set point switch. Controller area network (CAN) interface 130 communicates with cruise control logic 120, distance sensor 132, and engine control module 134. Cruise control logic 120 exchanges signal and status information with distance sensor 132, and cruise control status information and desired engine speed information with engine control module 134, via CAN interface 130. Preferably, CAN interface 130 communicates with engine control module 134 utilizing SAE J1922 or SAE J1939 status and control messages. Cruise control logic 120 may directly control engine retarder 136, or may optionally communicate via CAN interface 130 or via engine control module 134 depending upon the particular application.

Figure 3:
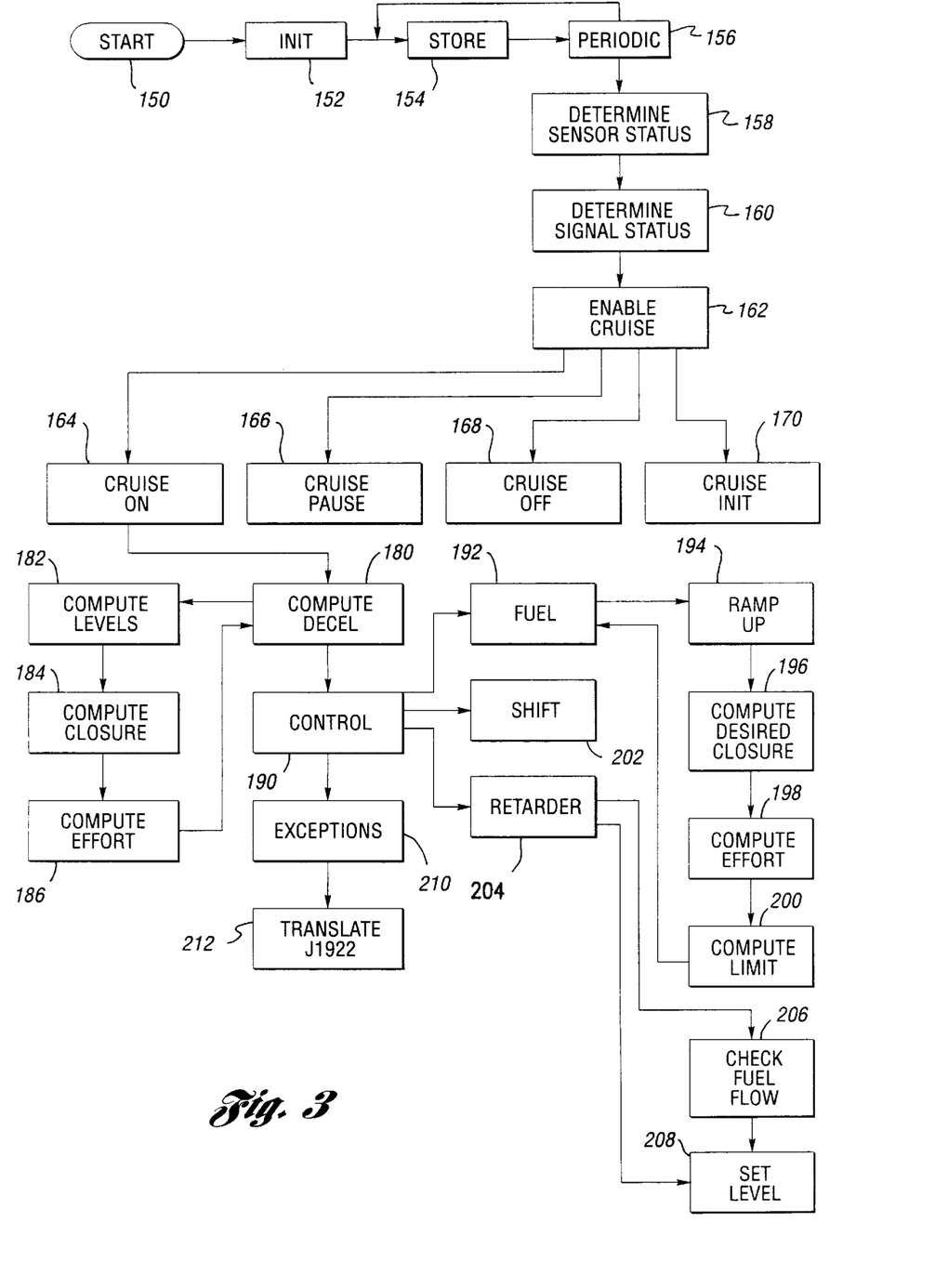
FIG. 3 is a more detailed block diagram illustrating logical connections and data flow for the control logic illustrated in FIG. 2.

Referring now to FIG. 3, a block diagram illustrating the logical connections and data flow for the cruise control logic of FIG. 2 is shown. It should be recognized that while some of the block diagrams and flowcharts presented in describing the present invention depict sequential processing of the method steps, any of a number of processing strategies could be utilized without departing from the spirit or scope of the present invention. For example, if the control logic is implemented in hardware, many of the method steps may be performed simultaneously or nearly simultaneously. Similarly, an interrupt driven processing strategy could also be utilized to achieve the objects and advantages of the present invention. One of ordinary skill in the art will also recognize that the concepts of the present invention may obviously be extended to a corresponding parallel implementation without departing from the spirit or the scope of the present invention. Similarly, a combined sequential/parallel implementation utilizing hardware and/or software to accomplish one or more of the objects and advantages of the present invention is within the contemplation of the present invention.

The control logic begins at block 150 of FIG. 3 when power is applied to the system. Block 152 initializes system variables, resets counters, and reads calibration variables which provide the processor with information relative to the existence and/or status of various components such as whether an engine retarder is installed and whether the vehicle has an transmission capable of automatic shifting. Block 154 transfers current system variable values to memory as "previous" values so that the system can assume or maintain a previous state if a signal outage occurs as explained in detail below. Block 156 performs the remainder of the cruise control logic functions having reference numerals 158 through 212 each cycle before returning to block 154 and the process continues as long as power is applied to the system.

With continuing reference to FIG. 3, block 158 reads messages from the distance sensor to determine its status. Each cycle, the sensor preferably broadcasts a message via the CAN interface which includes the distance and closing rate between the vehicle and two forward vehicles and the status of the sensor unit. Of course, the control logic of any one of the system processors could calculate the inter-vehicle distance by integrating the closing rate or relative velocity if desired. If the sensor indicates an error or malfunction, then the intelligent cruise control and preferably the traditional cruise control is disabled.

Block 160 analyzes the distance and closing rate information to determine whether a target vehicle is within range of the sensor. In a preferred embodiment, the sensor utilizes a microwave radar beam to sense up to two (2) forward vehicles within a range of approximately 350 feet relative to the host vehicle. The sensor determines the distance and closing rate based on a Doppler shift between transmitted and return signals with the frequency shift indicating the velocity of the target vehicle relative to the host vehicle. Thus, if the host vehicle is travelling at the same speed as the target vehicle within the range of the distance sensor, the doppler shift will be near zero and the distance sensor will broadcast this as the distance and closing rate relative to the forward vehicle. However, if no forward vehicle is detected (which may be due to electromagnetic interference or unanticipated scattering of the transmitted radar beam), the distance sensor also broadcasts a distance and closing rate of zero. Block 160, then, examines the signal over a predetermined period of time, preferably two (2) seconds, to determine whether the former or latter condition actually exists. If the sensor broadcasts a distance of zero for more than the predetermined period of time and a malfunction is not indicated, then the system assumes no target vehicle is present. Otherwise, during brief interruptions in the signal, a zero order hold is applied to the system values, i.e. the system maintains its previous speed and engine retarder value unless fuel flow to the engine cylinders is detected as explained in detail below. If fuel flow is detected, the engine retarder is deactivated.

Alternatively, a first order hold may be utilized during brief interruptions in the signal which utilizes the previous value of the inter-vehicle distance and speed. If a sudden decrease of inter-vehicle distance is detected but the inter-vehicle distance remains positive, the system reacts immediately. This may occur if a second forward vehicle moves between the first forward vehicle and the host vehicle. If a sudden increase in signal values is detected, the system imposes a delay, preferably about two seconds, before reacting. This may occur when the vehicle is rounding a curve and the sensor temporarily fails to detect the forward vehicle or temporarily detects a second forward vehicle.

Block 162 of FIG. 3 represents the current state of the intelligent cruise control which may assume one of the states represented by blocks 164 through 170. Intelligent cruise begins in the OFF state represented by block 168 where any transmission shift request or engine retarder (and fueling or defueling) request is canceled. If the vehicle road speed is above a predetermined minimum road speed, preferably 30 mph, and the set cruise button is depressed, the state changes to initialization (INIT) as represented by block 170. The INIT state resets various counters and establishes the cruise control set speed at the current vehicle road speed. This set speed may be characterized as the maximum speed which will be attained by the intelligent cruise system. That is, if the host vehicle is following a target vehicle which subsequently accelerates, the host vehicle will accelerate until achieving the cruise control set speed. Thus, the cruise control set speed overrides the desired following distance selected by the operator via the dashboard console potentiometer.

While in the INIT state, if the vehicle road speed subsequently falls below the allowed minimum, or the driver depresses the accelerator pedal beyond a specified point (85% in a preferred embodiment), then the state changes to PAUSE as represented by block 166. This allows the driver to overtake a slow vehicle rather than following it. Once the accelerator pedal position returns below a second specified point, preferably 50%, the cruise control resumes its previous function of either following a forward vehicle (distance control mode) or maintaining the desired cruise set point (speed control mode). Traditional cruise control functions implemented in the engine control module relinquish control to the operator if the torque requested via the accelerator pedal exceeds the torque determined by the cruise control module. The present invention utilizes accelerator pedal position to provide a similar feature since the torque information is not always readily available to "foreign" processors, i.e. other than the engine control module. Furthermore, in some engines pedal position corresponds to engine speed and not engine torque (i.e. all-speed engines). In other engines, such as min-max engines, pedal position corresponds to engine torque. Thus, by utilizing accelerator pedal position, a single implementation of the present invention may be used with either engine type. If the vehicle brake pedal is depressed or the distance sensor indicates an error, the state changes to OFF as represented by block 168. Otherwise, the state changes to ON as represented by block 164.

Upon entering the PAUSE state as represented by block 166, any transmission shift request or engine retarder request (or fueling or defueling request) from the intelligent cruise control is reset or canceled.

While in the PAUSE state, if the accelerator pedal position returns below the second specified point (50% in a preferred embodiment) and the vehicle road speed remains above the predetermined minimum point, then the state changes to ON as described above. If the brake pedal is depressed or the distance sensor indicates an error, then the state changes to OFF. If the vehicle road speed is above the predetermined minimum speed and the set cruise button is depressed, the state changes to the INIT state which re-establishes the cruise set point at the current vehicle road speed.

When in the ON state as represented by block 164 of FIG. 3 and the accelerator pedal position exceeds the first specified point or the vehicle road speed decreases below the predetermined minimum speed, then the state changes to PAUSE. As in the previously described states, if the brake pedal is depressed or the distance sensor indicates an error then the state changes to OFF. Otherwise, the control logic proceeds to effect the functions illustrated in blocks 180 through 212.

Figure 7:
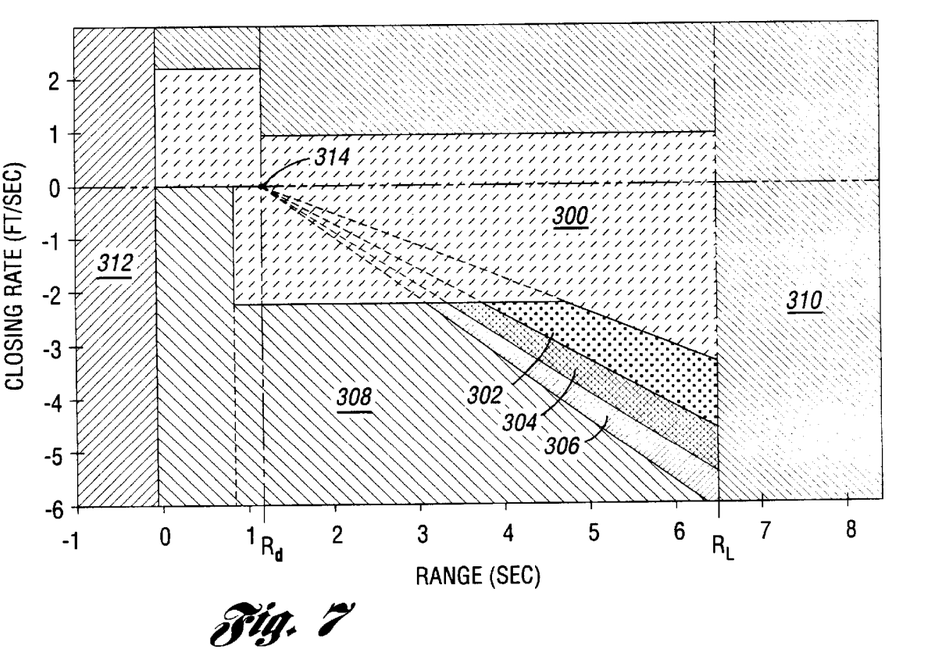
FIG. 7 is a graph illustrating selection of vehicle deceleration devices based on headway distance according to the present invention.

Block 180 computes the acceleration or deceleration (hereinafter collectively referred to as "deceleration") required to keep the desired headway distance between the host vehicle and a forward vehicle. Selection of appropriate deceleration devices to accomplish this function is illustrated graphically in FIG. 7. Region 300 of FIG. 7 represents those conditions where only fuel control is required to achieve the desired deceleration. Fuel control may consist of increasing or decreasing the fuel supply to the engine corresponding to a positive or negative closing rate, respectively. Region 300 should surround equilibrium point 314 with a sufficient area to eliminate rapid state transitions between regions 300 through 310.

As also illustrated in FIG. 7, regions 302, 304, and 306 represent those conditions requiring defueling of the engine and application of a first, second, and third level of engine braking, respectively. The slope of the lines separating these regions is based on deceleration of a fully loaded vehicle (the worst case deceleration scenario) as explained with reference to FIG. 5 below. Region 308 represents those conditions where defueling, maximum engine braking, and a transmission downshift is requested. Region 310 represents conditions where intelligent cruise control is contraindicated, such as when the target vehicle is beyond the range limit, $R_L$, of the distance sensor. Since $R_L$ is determined in seconds, its position will vary based on the fixed operating range of the distance sensor and the current vehicle road speed.

Region 312 of FIG. 7 represents a collision since the distance between the forward vehicle and the host vehicle would be less than zero. The equilibrium point 314 is determined where the desired following range, $R_D$, intersects the zero closing rate line, indicating perfect tracking of the forward vehicle at the desired following distance. The various regions illustrated represent worst case deceleration which is when the vehicle is fully loaded as explained in greater detail below. A negative closing rate indicates the inter-vehicle distance is decreasing so as to indicate deceleration whereas a positive closing rate requires acceleration until the desired following range is achieved or the vehicle reaches the cruise set point.

Returning now to FIG. 3, block 182 computes the deceleration levels for the available deceleration devices in the system. In a preferred embodiment, a nominal value of −0.022 g is utilized as the deceleration for a fully loaded vehicle of approximately 72,400 pounds when defueled. Thus, in a vehicle equipped with a sensor having an operational range of about 350 feet and not having an engine retarder, the intelligent cruise control of the present invention can approach and track a target vehicle without driver intervention as long as the initial relative velocity between the two vehicles is less than about 13 mph. The deceleration factor increases by about 20% for each level of engine retardation in vehicles equipped with a conventional engine brake. This allows the system to track a forward vehicle with an initial relative vehicle velocity of about 18 mph. Of course, these values will vary depending upon the particular application so the present invention utilizes calibration parameters and calculates the actual deceleration levels at runtime as represented by block 182. Block 184 then determines the closing rate to the equilibrium value as illustrated in FIG. 7 based on the inter-vehicle closing rate and the current level of deceleration. Block 186 then determines the deceleration effort required to asymptotically converge to the equilibrium point 314 (of FIG. 7).

Block 190 then controls the appropriate systems and subsystems as represented by blocks 192, 202, and 204, and explained in detail below. Block 210 handles exceptions to normal system operation. For example, if a sensor fault or malfunction is indicated, block 210 cancels any shift request or retarder request and resets the cruise high limit to zero. If a distance signal outage is indicated, block 210 sets the various parameter values to their corresponding values subsequent to the signal loss. Block 212 may be used if necessary to limit the acceleration requested by the intelligent cruise system prior to communicating an SAE J1922 engine speed control command. This feature is provided for use with engines having an aggressive response to reduce or eliminate undesirable engine surges. In a preferred embodiment, the acceleration is limited to a step increase of 3 mph. Block 212 then determines the desired engine speed to achieve the desired vehicle road speed based on the desired acceleration, the vehicle axle ratio, and the current transmission gear ratio.

Figure 4:
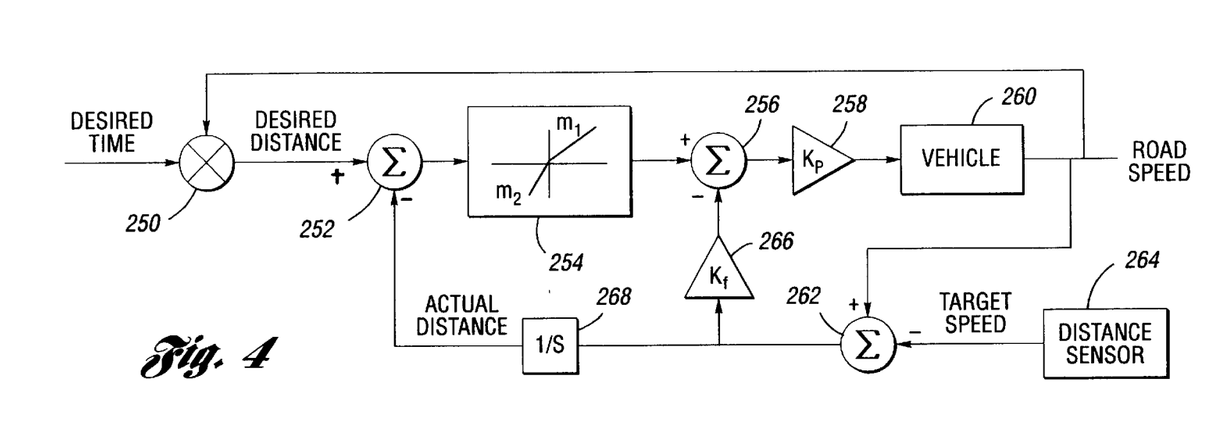
FIG. 4 is a block diagram illustrating a control system and method for intelligent cruise control according to the present invention.

FIG. 4 is a block diagram illustrating a fuel control strategy according to the present invention which is represented generally by block 192 of FIG. 3. This function determines the desired engine speed to be broadcast to the engine control module via J1922 or J1939 to accomplish the required distance control. Block 250 of FIG. 4 multiplies the desired headway time determined by the vehicle operator by the current vehicle road speed to obtain the desired following distance for the current vehicle road speed. Block 252 compares the desired distance to the actual distance to generate a distance error. This difference is utilized to determine a desired closing rate as represented by transfer function 254. In a preferred embodiment, transfer function 254 includes two (2) linear portions having different slopes $m_1$ and $m_2$. Positive distance differences indicate the inter-vehicle distance is greater than desired whereas the converse is represented by negative distance differences. Preferably, $m_2$ represents a higher gain or slope than $m_1$ which reflects a bias against operating at distances closer than desired. Of course, the transfer function may be customized for particular applications and need not be linear nor have slopes as illustrated by example in FIG. 4.

The remaining blocks of FIG. 4 represent a simple proportional control system. Block 256 generates a closing rate error signal which is the difference between the desired closing rate and the actual closing rate as determined by the feedback loop with feedback gain $K_f$. This function is represented generally by block 196 of FIG. 3. Blocks 194, 198, and 200 of FIG. 3 are analogous to blocks 256 through 266 of FIG. 4. Block 258 of FIG. 4 represents the forward or proportional gain factor $K_p$ and block 260 represents the vehicle speed which is controlled via the engine utilizing the engine speed control mode of J1922 or J1939. Block 264 represents the distance sensor input which is compared to the actual vehicle road speed value at block 262 to produce a closing rate. Block 268 integrates the actual closing rate to determine the actual distance for the outer feedback loop.

The degree of success of the control system illustrated in FIG. 4 can be quantified mathematically utilizing FIG. 7 by computing the distance from the current operating point to the equilibrium point using the basic distance formula:

$$r = \sqrt{(d_{des} - d_{act})^2 + (rt_{des} - rt_{act})^2} \quad (1)$$

where $d_{des}$ represents the desired distance, $d_{act}$ represents the actual distance, $rt_{des}$ represents the desired closing rate, and $rt_{act}$ represents the actual closing rate. This cost function can be utilized to optimize the four control parameters, the proportional gain, $K_p$, the feedback gain, $K_f$, and the two parameters, $m_1$ and $m_2$, which map the distance error into a desired closing rate as represented by block 254.

Returning now to FIG. 3, block 194 functions to ramp the vehicle speed up to the cruise control set point if no target vehicle is detected, or if the inter-vehicle closing rate is positive such that the host vehicle needs to accelerate relative to the target vehicle. Blocks 196 to 200 represent defueling functions which may be implemented utilizing the engine speed and torque limit control function of J1922 or J1939. Once the desired closing rate is determined by block 196, block 198 determines the necessary vehicle speed decrease. Block 200 then determines a corresponding upper engine speed limit which will be broadcast via the communications link to the ECM. Whenever the upper limit value exceeds the current engine speed, the ECM defuels the engine resulting in the desired deceleration. Alternatively, block 200 may determine a corresponding upper cruise control limit which is below the current vehicle road speed and broadcast this value via J1587 to the ECM to accomplish similar results.

Some engine manufacturers limit the amount of time that particular override control modes may be continuously enabled. Thus, the present invention accommodates these engine control strategies by periodically switching between control modes. For example, if an engine manufacturer limited the amount of time which engine speed control mode could be continuously enabled, the present invention periodically switches from engine speed control mode to engine torque control mode requesting an output torque equal to the output torque broadcast by the ECM via J1587, J1922, or J1939 on the previous cycle. Then control may be returned to the engine speed control mode without triggering the control mode timeout and without affecting system performance. In one embodiment, th e present invention switches from engine speed control mode to engine torque control mode every second and remains in that mode for 25 milliseconds before returning to engine speed control mode.

Block 202 of FIG. 3 determines whether to request an upshift or downshift from the transmission based on the level of deceleration required. The current engine speed, transmission gear ratio, and axle ratio are examined to determine whether a downshift can be effected without exceeding recommended engine speed levels. Similarly, if engine speed approaches an upper limit and further acceleration is required to attain the selected headway distance, an upshift may be requested.

Block 204 of FIG. 3 effects control of the engine retarder to achieve the desired deceleration level. Since the engine retarder is directly controlled, block 206 assures that all fuel has been combusted in the cylinders before activating the engine brake. Fuel flow is estimated based on a percent utilization of peak torque parameter which is transmitted by the engine over the communication link via J1922. The actual calculation may vary by engine manufacturer. However, in a preferred embodiment this parameter is given by:

$$\% \text{ peak torque} = \frac{\text{fuel current} - \text{fuel frict} @ N}{\text{fuel peak torque} - \text{fuel frict} @ PTS}$$

where % peak torque=estimated percent utilization of peak torque; fuel current=current fuel metering command; fuel frict @ N=fuel required to overcome estimated frictional load at current engine speed; fuel peak torque=fuel required to develop peak torque; and fuel frict @ PTS=fuel required to overcome estimated frictional load at peak torque speed. A nonpositive value for this parameter indicates zero fuel. A safety factor is built into the system to account for any inaccuracies in the calculation. Once it is determined that fuel has been cut off, block 208 actuates the required number of cylinders to effect the desired deceleration level.

Figure 5:
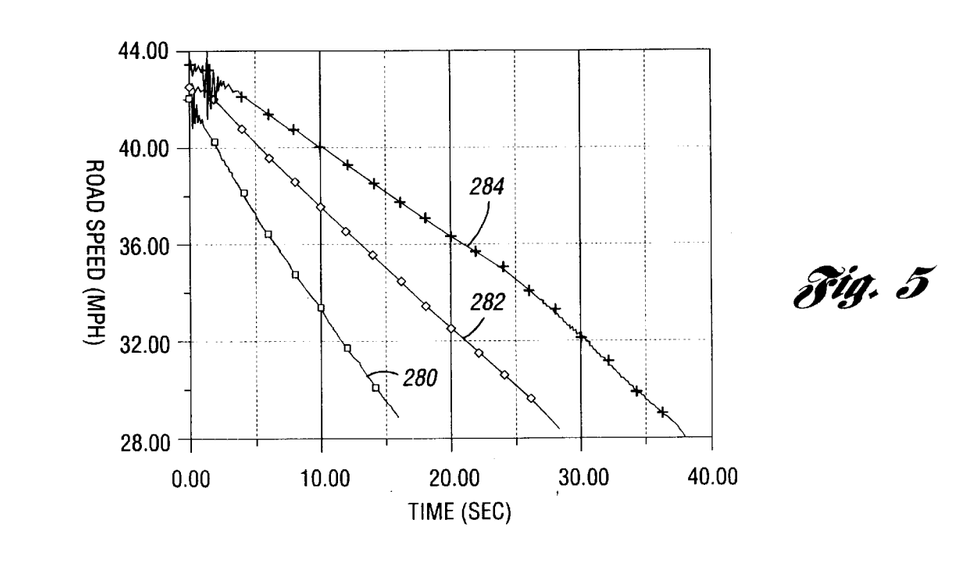
FIG. 5 is a graph depicting vehicle speed as a function of time illustrating variation in vehicle deceleration due to vehicle weight.

Referring now to FIG. 5, a graph is shown illustrating typical deceleration values for a tractor semi-trailer vehicle with various loads. Line 280 represents a "bobtail" tractor, i.e. no semi-trailer attached to the tractor with a gross combined weight of about 20,000 pounds. A linear approximation of the deceleration for this loading condition is about −0.82 mph/s. Line 282 represents a tractor with an empty semi-trailer attached having an approximate deceleration of about −0.51 mph/s and line 284 represents a tractor with a fully loaded semi-trailer having a gross combined weight of about 72,400 pounds and an approximate deceleration of −0.36 mph/s. This information is utilized in developing the deceleration levels illustrated in FIG. 7 and discussed above. Of course, if the actual vehicle weight can be determined or estimated, actual deceleration values may be used in determining the deceleration capabilities associated with defueling and engine braking. A number of methods may be utilized to provide an estimate of GCW such as those disclosed in U.S. Pat. Nos. 5,335,566 and 5,272,939, the disclosures of which are hereby incorporated by reference in their entirety.

Figure 6:
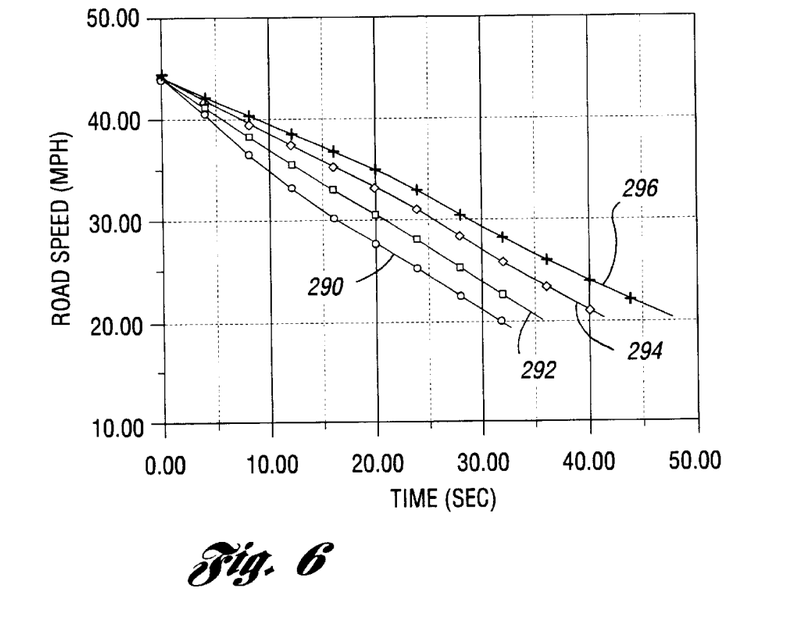
FIG. 6 is a graph depicting vehicle speed as a function of time illustrating variation in vehicle deceleration due to actuation of an engine retarder according to the present invention.

Referring now to FIG. 6, a graph is shown illustrating vehicle deceleration for various engine braking levels in a fully loaded vehicle. Line 290 represents maximum engine braking with an approximate linear deceleration of −0.73 mph/s. Line 292 represents an intermediate level of engine braking with an approximate linear deceleration of −0.65 mph/s. Line 294 represents a low level of engine braking with an approximate linear deceleration of −0.52 mph/s and line 296 represents defueling only with no engine braking with an approximate linear deceleration of −0.44 mph/s. Thus, each level of engine breaking increases deceleration by about 20%.

Figure 8:
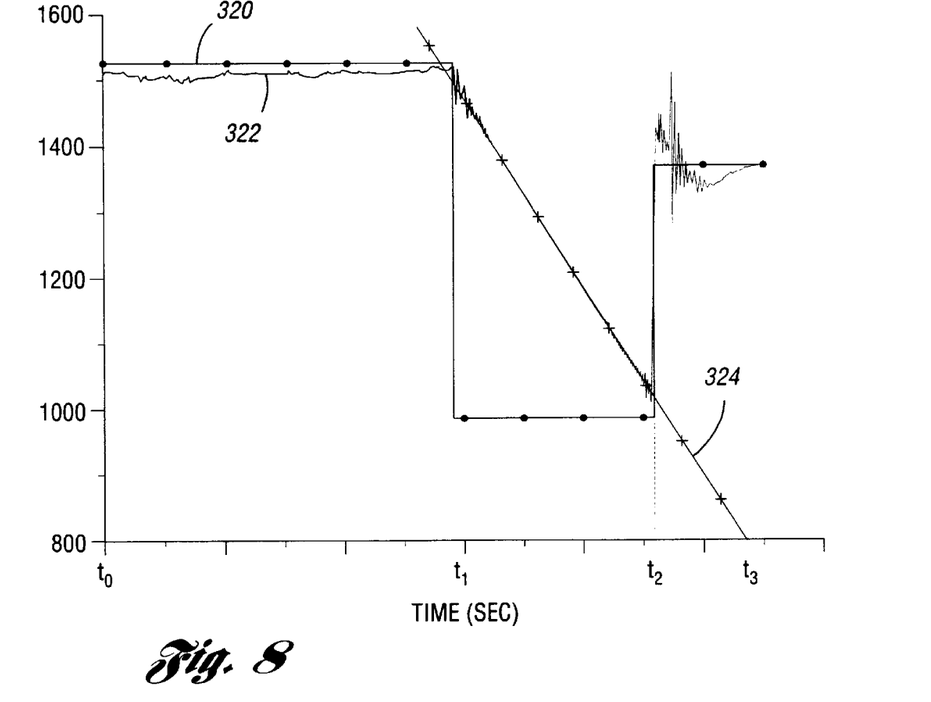
FIG. 8 is a graph illustrating operation of an intelligent cruise control utilizing the engine speed control mode of SAE J1922 or SAE J1939 according to the present invention.

FIG. 8 illustrates the response of an engine being operated in the engine speed control mode under no-load conditions utilizing the SAE J1922 or SAE J1939 standard according to the present invention. Beginning at time $t_0$, the intelligent cruise control module has broadcast an appropriate message to put the engine into engine speed control mode. The desired engine speed as determined by the intelligent cruise control logic is represented by line 320. The actual engine speed is represented by line 322. As illustrated, the ECM adjusts the fueling appropriately to maintain the actual engine speed slightly below the desired engine speed. Thus, from time $t_0$ to time $t_1$, the intelligent cruise control logic periodically broadcasts the same desired engine speed and the ECM performs the actual control function (typically proportional-integral control, i.e. PI or PID control) to maintain that engine speed.

At time $t_1$ of FIG. 8, the desired engine speed determined by the intelligent cruise control is decreased. This may result from a forward target vehicle suddenly moving into the same lane as the host vehicle. The actual engine speed decays approximately linearly at a rate of about 30 rpm/s in a preferred embodiment as represented by line 324. If the engine is equipped with an engine retarder such as the well known Jacobs engine brake, or a similar device, a higher rate of deceleration may be achieved by automatically actuating the engine retarder as discussed above.

At time $t_2$, the desired engine speed determined by the intelligent cruise control logic is increased. As illustrated, the actual engine speed responds more quickly to increases in commanded engine speed. At time $t_3$, however, the actual engine speed is again approximately equal to the desired engine speed as determined by the cruise control logic and broadcast using SAE J1922 or J1939. Of course the actual response time and characteristics may vary depending upon a number of factors including the particular engine and engine calibrations, the transmission, the vehicle weight, and the current operating conditions.

Since the engine speed control mode of SAE J1922 and J1939 overrides the current operating control mode, the intelligent cruise control and a traditional cruise control, if present, should not be engaged at the same time since the control functions would compete for control of the engine which may result in erratic behavior.

Figure 9:
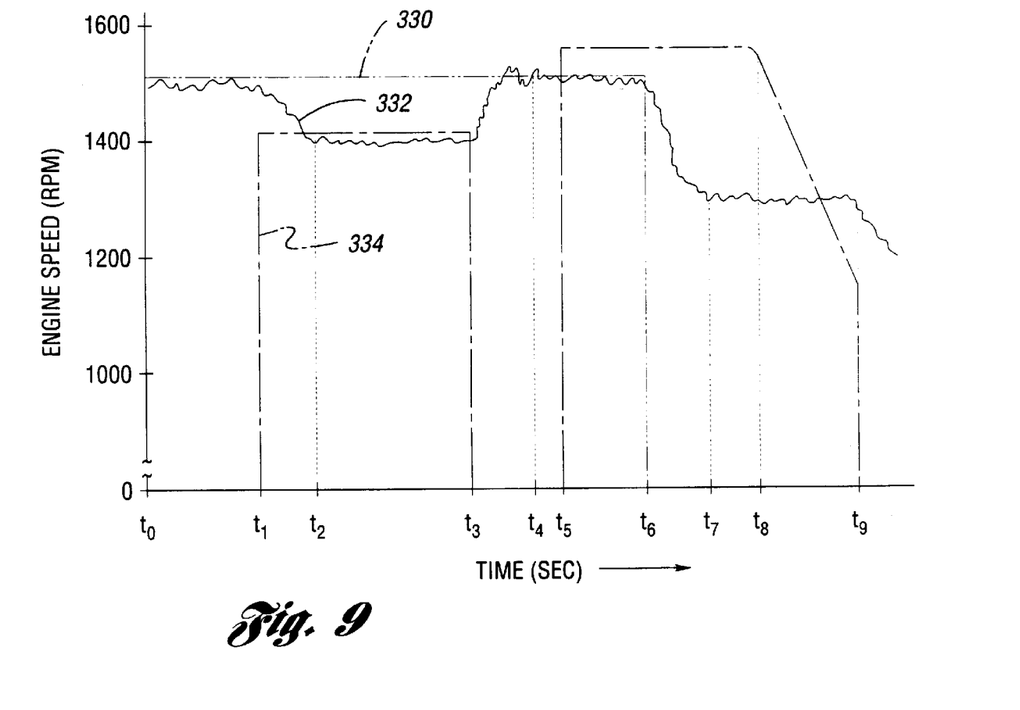
FIG. 9 is a graph illustrating operation of an intelligent cruise control utilizing the engine speed and torque limit control mode of SAE J1922 or SAE J1939 according to the present invention.

Referring now to FIG. 9, a graph of engine speed as a function of time is shown to illustrate operation of another embodiment of the present invention for implementing intelligent cruise control functions with control logic external to an engine electronic control module. The embodiment illustrated in FIG. 9 utilizes the speed and torque limit control mode of the SAE J1922 or J1939 specification to implement intelligent cruise control functions and accommodate a traditional cruise control if present.

In this embodiment, the driver initiates cruise control by manipulating the various cruise switches on the dashboard console. Separate switches may be provided for intelligent cruise control or alternatively, the same cruise switches may be utilized for both functions since the status of the switches is broadcast over J1587. The conventional cruise control functions are overridden by the intelligent cruise control logic when activated. The intelligent cruise control may then reduce the vehicle speed using the J1939 or J1922 engine speed and torque limit control mode. During operation, the intelligent cruise control logic broadcasts an engine speed upper limit and a percent torque value limit over a standard communications interface to the ECM. The ECM receives this data and controls engine fueling to limit the engine speed and torque to the value received. In a preferred embodiment, an engine speed limit value is calculated and broadcast based on the required deceleration while the torque limit value is set to maximum torque (100%).

This embodiment allows simultaneous operation of the traditional cruise control and the intelligent cruise control since the latter only imposes an upper limit on the desired engine speed determined by the former. This has the advantage of allowing the vehicle to maintain its characteristic driveability or feel as determined by the engine/vehicle manufacturer in effecting the cruise control functions. For example, to facilitate product differentiation, one engine manufacturer may impose tighter control on the controlled variable (engine speed or vehicle speed) while in cruise control than another manufacturer. However, in speed control mode, it is difficult to distinguish between various manufacturers since many impose more stringent control as defined by the J1922 and J1939 standards. Since this embodiment of the present invention utilizes the engine speed and torque limit control mode, the underlying characteristics of the parameter control effected by the ECM remain unchanged and may therefore be indicative of a particular ECM/engine manufacturer.

Utilizing the engine speed and torque limit control mode defined by the J1922 and J1939 standards also imposes less demanding communication requirements on the intelligent cruise control function. Unlike the speed control mode which requires periodically broadcasting the desired engine speed, the engine speed and torque limit control mode remains in effect until changed or canceled by a subsequent broadcast. Thus, it is not necessary for the intelligent cruise control to continually monitor the status of the traditional cruise control since it is not responsible for actually implementing the control function.

The graph of FIG. 9 illustrates a desired engine speed as determined by the traditional cruise control 330, an actual engine speed 332, and a desired engine speed as determined by an intelligent cruise control 334 which is imposed via the engine speed and torque limit control mode of J1922 or J1939. From time $t_0$ to time $t_1$, the actual engine speed follows the engine speed determined by the traditional cruise control function and the intelligent cruise control is not broadcasting a speed limit control message. From time $t_1$ to time $t_3$, the intelligent cruise control function broadcasts an appropriate message via the standard communications interface to the ECM to request the engine speed and torque limit control mode. A requested engine speed is also broadcast which overrides the engine speed determined by the traditional cruise control.

With continuing reference to FIG. 9, the actual engine speed decreases from time $t_1$ to time $t_2$ where it is limited by the intelligent cruise control functions. At time $t_3$, the intelligent cruise control returns the ECM to normal control mode and the traditional cruise control regains control of the engine speed which reaches a steady state value at time $t_4$. At time $t_5$, the intelligent cruise broadcasts a limit which exceeds the current set point for the traditional cruise control. Since this is an upper limit, the engine speed continues to follow the desired engine speed determined by the traditional cruise control. At time $t_6$, the traditional cruise control is deactivated and the engine speed decreases until time $t_7$ where the operator resumes control via the vehicle accelerator pedal. From time $t_8$ to time $t_9$, the intelligent cruise control continues to lower the set speed due to a decreasing distance between the host vehicle and a forward vehicle, for example. However, since the traditional cruise control is deactivated, the desired engine speed determined by the intelligent cruise control does not impose an upper limit on the engine speed requested by the driver.

The embodiment characterized in FIG. 9 may be utilized in cooperation with a compression release engine retarder or similar engine braking device. Use of an engine braking device increases the rate of engine deceleration when applied and provides the control system with greater authority to further reduce unnecessary driver intervention as explained above.

Figure 10:
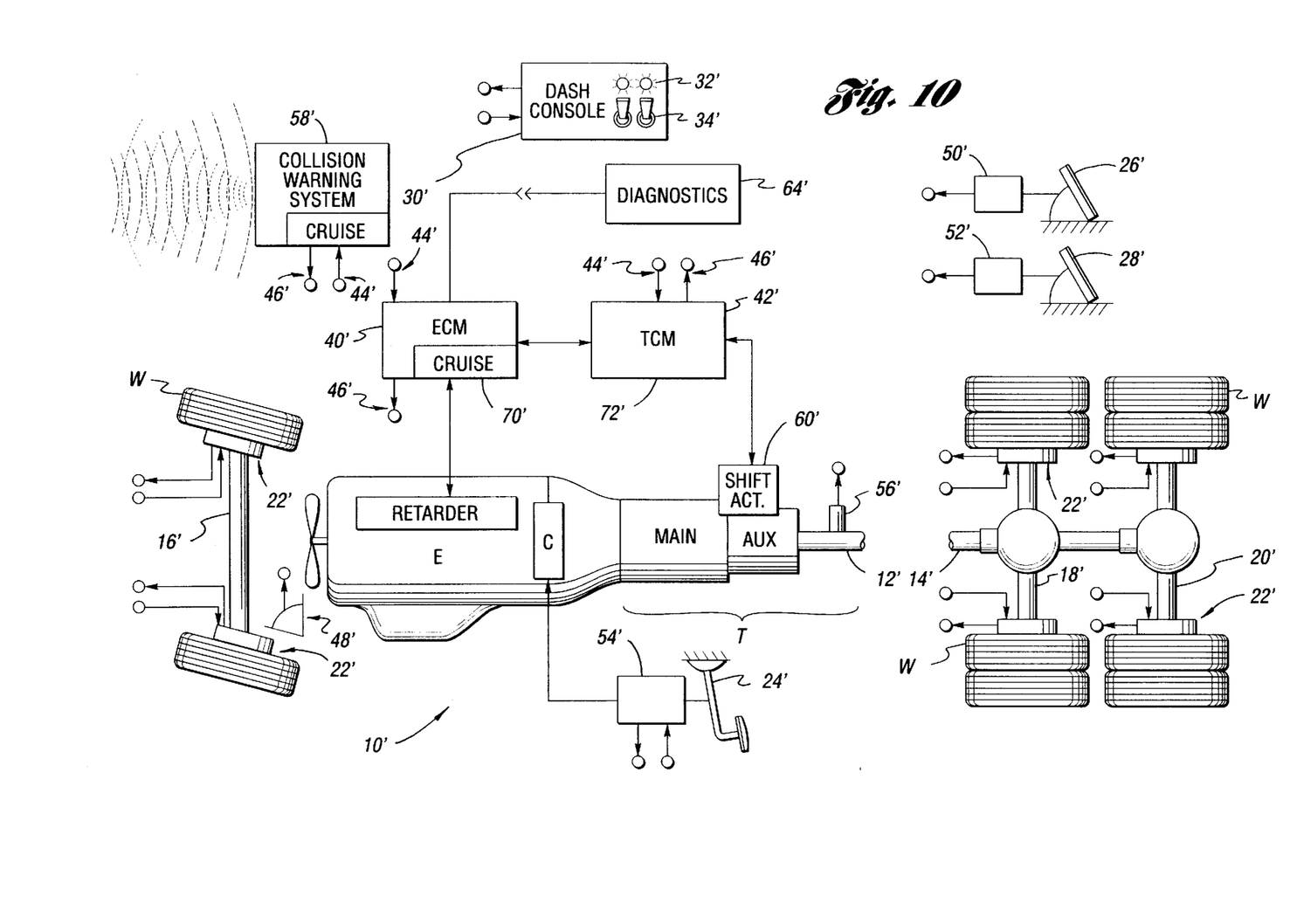
FIG. 10 is a block diagram of an alternative embodiment having intelligent cruise control logic within a collision warning system according to the present invention.

FIG. 10 illustrates another embodiment of a system and method according to the present invention. The components having primed reference numerals correspond in structure and function to similar components as illustrated and described with reference to FIG. 1. However, the embodiment of FIG. 10 includes cruise control logic within a collision warning system 58', such as the EVT-200 manufactured by Eaton VORAD, rather than within the ECM or the TCM Thus, in this embodiment, distance and closing rate information is directly available to the control logic without being broadcast over a communication link. The control logic within the collision warning system then communicates the appropriate control commands to the ECM and/or TCM utilizing SAE J1922 or SAE J1939 as described above. Of course, the control logic may also be in direct communication with an engine retarder, or may communicate via the ECM as illustrated.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A method for controlling vehicle speed in a vehicle with an engine controlled by an electronic control module having a plurality of standard engine control modes selectable via a communications interface and a sensor in communication with the electronic control module for sensing distance between the vehicle and at least one forward object, the method comprising:

detecting the at least one forward object and determining the distance relative to the vehicle;

selecting at least one device for effecting a change in the vehicle speed based on the determined distance and a desired following distance;

selecting one of the plurality of standard engine control modes via the communications interface determining a vehicle parameter associated with the selected standard engine control mode;

determining a desired value for the vehicle parameter associated with the selected standard engine control mode based on the determined distance and the desired following distance; and communicating the desired value to the electronic control module via the communications interface to control the vehicle speed.

2. The method of claim 1 wherein the vehicle includes an engine retarder and an automated multiple ratio transmission both in communication with the electronic control module and wherein the step of selecting at least one device comprises:

selecting at least one device for effecting a change in the vehicle speed from the group consisting of the engine, the engine retarder, and the transmission.

3. The method of claim 1 wherein the selected standard engine control mode is an engine speed control mode and wherein the desired value represents a desired engine speed value.

4. The method of claim 1 wherein the selected standard engine control mode is an engine torque control mode, the vehicle parameter is engine torque, and wherein the desired value represents a desired engine torque value as determined by the electronic control module.

5. The method of claim 1 wherein the desired value represents a desired engine torque value as broadcast by the electronic control module according to a published standard.

6. The method of claim 1 further comprising:

selecting a desired cruise control speed; and maintaining the desired cruise control speed when no forward object is detected by broadcasting a vehicle parameter value from the sensor based on the desired cruise control speed to the electronic control module via the communications interface.

7. The method of claim 1 wherein the step of determining a desired vehicle parameter value comprises:

selecting a desired cruise control speed;

determining a contingent vehicle parameter value based on the determined distance and the desired following distance; and setting the desired value to the smaller of the desired cruise control speed and the contingent vehicle parameter value.

8. The method of claim 1 wherein the step of determining a desired vehicle parameter value comprises determining a desired engine speed limit value.

9. The method of claim 1 wherein the plurality of engine control modes includes engine control modes defined by a published standard.

10. A method for controlling vehicle speed in a vehicle with an engine controlled by an electronic control module having a plurality of standard engine control modes selectable via a communications interface and a sensor in communication with the electronic control module for sensing distance between the vehicle and at least one forward object, the method comprising:

detecting the at least one forward object and determining the distance relative to the vehicle;

selecting at least one device for effecting a change in the vehicle speed based on the determined distance and a desired following distance;

determining a desired vehicle parameter value based on the determined distance and the desired following distance;

selecting one of the plurality of standard engine control modes via the communications interface; and     communicating the desired vehicle parameter value to the electronic control module via the communications interface to control the vehicle speed;

wherein the plurality of engine control modes includes an engine speed and torque limit control mode and wherein the step of selecting one of the plurality of engine control modes includes selecting the engine speed and torque limit control mode.

11. A method for controlling vehicle speed in a vehicle with an engine controlled by an electronic control module having a plurality of standard engine control modes selectable via a communications interface and a sensor in communication with the electronic control module for sensing distance between the vehicle and at least one forward object, the method comprising:

detecting the at least one forward object and determining the distance relative to the vehicle;

selecting at least one device for effecting a change in the vehicle speed based on the determined distance and a desired following distance;

determining a desired vehicle parameter value based on the determined distance and the desired following distance;

selecting one of the plurality of standard engine control modes via the communications interface; and     communicating the desired vehicle parameter value to the electronic control module via the communications interface to control the vehicle speed;

wherein the step of selecting one of the plurality of engine control modes comprises selecting one of the plurality of engine control modes based on a predetermined time interval so as to periodically switch between at least two of the plurality of engine control modes.

12. A method for controlling vehicle speed in a vehicle having at least a first and second microprocessor wherein the second microprocessor includes instructions which perform a cruise control function to control the vehicle speed based on a desired set speed, the method comprising:

using the first microprocessor to determine whether to increase or decrease the vehicle speed based on a desired vehicle speed and distance between the vehicle and a forward object and to generate a corresponding engine control command based on a standard engine control mode;

communicating the engine control command to the second microprocessor to control the vehicle speed.

13. The method of claim 12 wherein the step of communicating comprises communicating an engine torque corresponding to the desired vehicle speed.

14. The method of claim 12 wherein the step of using the first microprocessor comprises:

determining the desired vehicle speed based on a closure rate between the vehicle and the forward object.

15. The method of claim 12 wherein the step of communicating includes transmitting a signal parameter value based on distance between the vehicle and the forward object and based on a desired following distance and selecting one of a plurality of standard engine control modes, and wherein the step of communicating further includes communicating the desired vehicle parameter value to the second microprocessor to control the vehicle speed.

16. A method for controlling vehicle speed in a vehicle with an engine controlled by an engine control module having a plurality of selectable standard engine control modes, a transmission controlled by a transmission control module in communication with the engine control module, and a sensor for sensing distance between the vehicle and at least one forward object, the sensor communicating with at least one of the engine and transmission control modules, the method comprising:

detecting the at least one forward object and determining the distance relative to the vehicle;

selecting one of the plurality of standard engine control modes;

determining a vehicle parameter corresponding to the selected standard engine control mode and determining a desired value for the parameter based on the determined distance and a desired following distance; and     communicating the desired vehicle parameter value to the engine control module directly or via the transmission control module to control the vehicle speed.

17. A method for controlling vehicle speed in a vehicle with an engine controlled by an engine control module having a plurality of selectable standard engine control modes, a transmission controlled by a transmission control module in communication with the engine control module, and a sensor for sensing distance between the vehicle and at least one forward object, the sensor communicating with at least one of the engine and transmission control modules, the method comprising:

detecting the at least one forward object and determining the distance relative to the vehicle;

determining a desired vehicle parameter value based on the determined distance and a desired following distance;

selecting one of the plurality of standard engine control modes; and     communicating the desired vehicle parameter value to the engine control module directly or via the transmission control module to control the vehicle speed;

wherein the steps of determining a desired vehicle parameter value and selecting one of the plurality of standard engine control modes are performed by the transmission control module.

* * * * *